No. 717,666. PATENTED JAN. 6, 1903.
H. FAHLDIEK.
FIRE ESCAPE.
APPLICATION FILED MAY 13, 1902.
NO MODEL. 2 SHEETS—SHEET 1.

Witnesses:
Julius Lankes
R. P. Chamberlain

Henry Fahldiek, Inventor.
By Neuhart & Burkhart,
Attorneys.

No. 717,666. PATENTED JAN. 6, 1903.
H. FAHLDIEK.
FIRE ESCAPE.
APPLICATION FILED MAY 13, 1902.
NO MODEL. 2 SHEETS—SHEET 2.
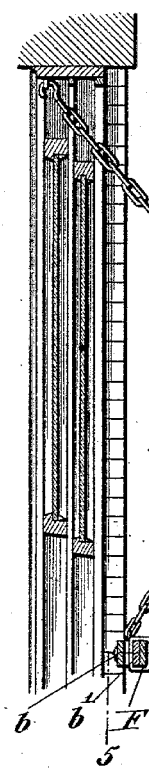
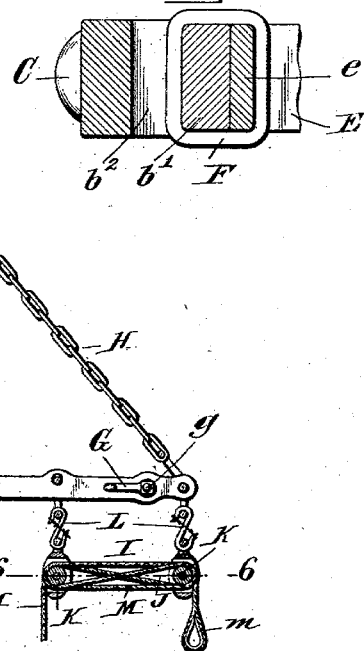
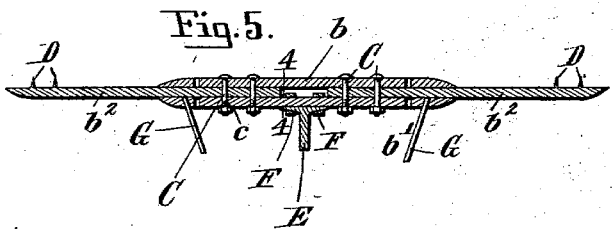
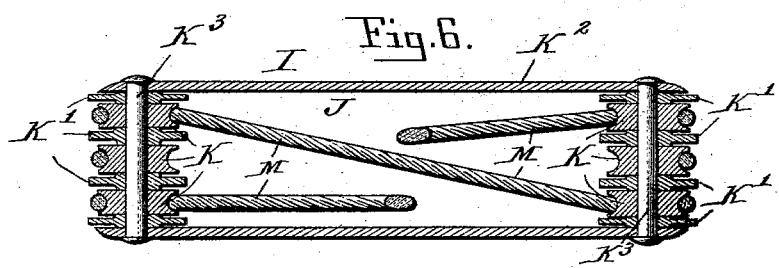
Witnesses:
Julius Lankes
R. P. Chamberlain
Henry Fahldiek, Inventor.
By Neuhart & Burkhart
Attorneys.

UNITED STATES PATENT OFFICE.

HENRY FAHLDIEK, OF NORTH TONAWANDA, NEW YORK.

FIRE-ESCAPE.

SPECIFICATION forming part of Letters Patent No. 717,666, dated January 6, 1903.

Application filed May 13, 1902. Serial No. 107,203. (No model.)

*To all whom it may concern:*

Be it known that I, HENRY FAHLDIEK, a citizen of the United States of America, and a resident of North Tonawanda, in the county of Niagara and State of New York, have invented certain new and useful Improvements in Fire-Escapes; and I do hereby declare that the following is a full, clear, and exact description of the invention, such as will enable others skilled in the art to which it appertains to make and use the same, reference being had to the accompanying drawings, which form a part of this specification.

My invention has reference to fire-escapes; and it consists of an improved form of portable apparatus devised to enable persons to escape from the windows of burning buildings with perfect safety.

The object of my invention is to construct a simple, effective, and inexpensive device the parts of which can be quickly and conveniently disassembled to permit of being placed within a small compass and be conveniently carried from place to place and owing to the arrangement and combination of parts can be made very light without impairing its strength or effecting its durability and rigidity.

A further object is to provide mechanism to retard the descent of the person being lowered to the ground.

Figure 1:
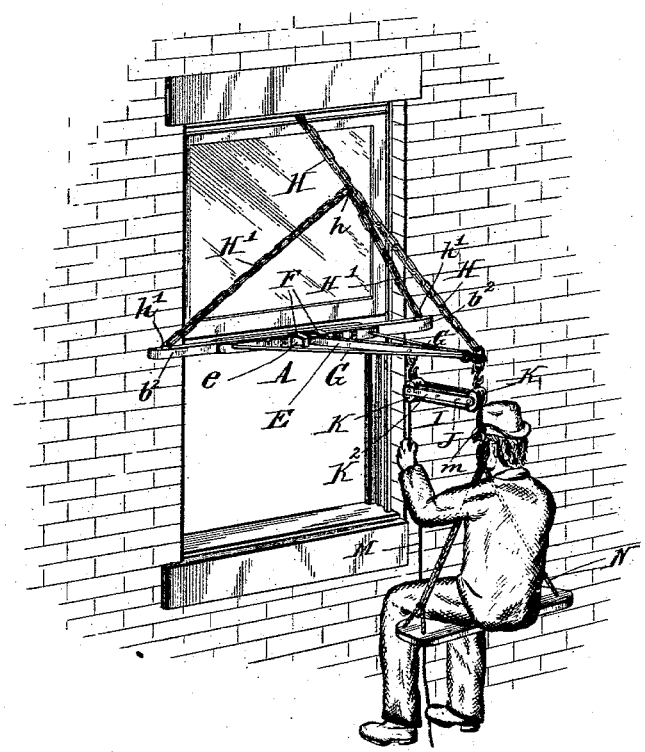
Figure 2:
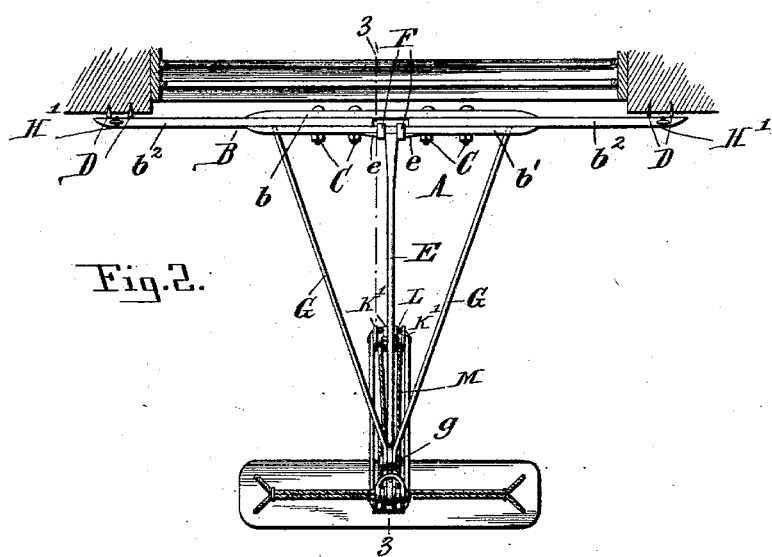

In the accompanying drawings, Figure 1 is a perspective view of my apparatus, showing the manner in which the same is used. Fig. 2 is a top plan view of the same, the supporting-chains being removed. Fig. 3 is a vertical central section thereof, taken on line 3 3, Fig. 2. Fig. 4 is a cross-section, on an enlarged scale, taken on line 4 4, Fig. 5. Fig. 5 is a horizontal section taken on line 5 5, Fig. 3. Fig. 6 is a similar section, on an enlarged scale, taken on line 6 6, Fig. 3.

Referring now to the drawings in detail, like letters of reference refer to like parts in the several figures.

The letter A designates the frame, which is preferably T-shaped, as illustrated in the drawings, and this frame I prefer to form of a number of metallic bars.

B designates the transverse bridge member, which abuts with its ends against opposite sides of the window and is composed of an inner and an outer connecting-bar $b$ $b'$, respectively, between which the adjustable abutting bars $b^2$ are confined by means of bolts C, which are adapted to pass through registering bolt-holes $c$, formed in the various parts of the bridge member. The adjustable abutting members are each provided with two bolt-holes, which can be made to register with any two adjacent bolt-holes formed in the inner and outer connecting-bars $b$ $b'$, each of which is provided with three or more bolt-holes. This arrangement permits of adjusting the abutting bars to any desired position within certain limits, thus providing a device which is applicable for use on buildings having wide or narrow windows. The outer or abutting ends are provided with spurs D, which become embedded in the building on opposite sides of the window to which the device is attached as soon as the weight of a person being lowered is imparted to the frame of the apparatus. The said prongs aid to steady the device and prevent swinging of the frame on the supporting-chains.

Secured to the bridge member midway between its ends is a supporting member E, disposed at right angles to said bridge member and having at its inner end the oppositely-disposed lateral extensions $e$, which are inclined or wedge-shaped and designed to bear against the outer connecting-bar of the bridge member. Coöperating with the said lateral extensions, so as to secure the supporting member to the bridge member, are loops F, which are movable on the outer connecting-bar of the bridge member and adapted to ride over the inclined or tapered lateral extension on the supporting-bar to clamp the same to the bridge member. By this means a very effective and secure fastening is provided between the two members. The lateral extensions $e$ also prevent lateral swaying of the supporting member to a certain extent; but in addition to this diagonal braces G are provided and connect the outer end of the supporting member with the bridge member at points between its ends and the point of connection with said supporting member, thus holding the latter against the slightest lateral movement. The outer ends of the brace-rods are connected to the supporting member by means of a bolt $g$, while their inner ends are held in pockets or depressions formed in the outer connecting-bar of the bridge member.

The frame is supported by cables or chains H H'. One end of the chain H is secured to the top of the window-casing, while the other end thereof is connected to the free end of the supporting member in any suitable manner. The chains H' are connected with one end to the chain H at a point about midway between its ends, as at $h$, and with their other ends they have connection with the ends of the bridge member, as at $h'$. By this arrangement the frame is supported at its three ends, which prevents the tilting of the same and places the greatest strain on the main or center chain.

To the outer end of the supporting member a retarding device I is supported, which is composed of a frame J and a series of pulleys K, arranged in sets of two or more. The pulleys of each set are separated from the adjacent pulley or pulleys of the set by spacing-pieces K', which may be connected together above and below the pulleys to form a pulley-block or in any other manner, while the two sets of pulleys are separated from each other by the side bars $K^2$, which form the frame J. The pulleys of each set are rotatable on a pintle $K^3$, supported in the frame J. The retarding device is supported by means of links L or other devices serving the purpose of links to permit of a slight swinging action; but such connection is not absolutely necessary.

A rope or cable M passes around the pulleys of the retarding device, first passing around one pulley of one set, then around a pulley of the other set, alternating until the opposite ends thereof pass over pulleys in the outer and inner set. The end of the rope passing finally over a pulley in the outer set is preferably provided with an eye $m$, to which a swing-seat N may be secured. Any other form of seat or any form of attachment may be used without departing from the invention. The other end of the rope, which is permitted to hang to the ground, is taken hold of by the party being lowered on the seat, and such party has therefore entire control of the apparatus, which he may stop on his descent or check in its velocity. The arrangement of the pulleys and the rope passing around the same permits of lowering a person to the ground within a certain speed only, which speed can, however, be further controlled by the operator. The speed with which a person will be lowered to the ground is checked by the resistance or friction necessarily created by the rope passing over a series of pulleys, which may be increased or reduced in number, according to circumstances. It is of course understood that with a certain number of pulleys in the series a heavy person will be lowered with greater speed than a light person will.

It is apparent that without departing from the scope of my invention various changes in construction may be resorted to without sacrificing any of the advantages thereof.

Having thus described my invention, what I claim is—

1. In a fire-escape, the combination of a frame comprising a bridge member for bridging an exit and a supporting member arranged at right angles to said bridge member, a main supporting-chain connected with one end to the building and with its other end to the outer end of the supporting member, and stay-chains connecting the ends of the bridge member and the said supporting-chain, substantially as set forth.

2. In a fire-escape, a frame comprising an adjustable bridge member for bridging an exit, a supporting member arranged at right angles to said bridge member, and diagonal braces connecting the supporting member with the bridge member, substantially as set forth.

3. In a fire-escape, a frame comprising a bridge member having pockets formed therein and being adapted to bridge an exit, a supporting member arranged at right angles to said bridge member, and diagonal braces secured with one of their ends to the supporting member and with their other ends entering the pockets in the bridge member, substantially as set forth.

4. In a fire-escape, a frame comprising a bridge member composed of an inner and an outer connecting-bar and end bars held adjustable between said connecting-bars, and a supporting member secured to the outer connecting-bar and arranged at right angles thereto, substantially as set forth.

5. In a fire-escape, a frame comprising a bridge member for bridging an exit, a supporting member arranged at right angles to said bridge member and having oppositely-disposed lateral extensions, and loops arranged to surround the said lateral extensions and the bridge member to secure the latter and the supporting member together, substantially as set forth.

6. In a fire-escape, a frame comprising a bridge member for bridging an exit, a supporting member arranged at right angles to said bridge member and having oppositely-disposed tapering extensions, and loops surrounding said tapering extensions and the bridge member to secure the latter and the supporting member together, substantially as set forth.

In witness whereof I have affixed my signature in the presence of two subscribing witnesses.

HENRY FAHLDIEK.

Witnesses:
CHAS. F. BURKHART,
JULIUS LANKES.